(12) United States Patent
Hoffman et al.

(10) Patent No.: US 8,596,828 B2
(45) Date of Patent: Dec. 3, 2013

(54) LIGHT BLOCK

(75) Inventors: Joseph A. Hoffman, Minneapolis, MN (US); John R. David, Stillwater, MN (US); Gilles J. Benoit, Minneapolis, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 257 days.

(21) Appl. No.: 13/143,421

(22) PCT Filed: Jan. 6, 2010

(86) PCT No.: PCT/US2010/020178
§ 371 (c)(1),
(2), (4) Date: Jul. 6, 2011

(87) PCT Pub. No.: WO2010/083074
PCT Pub. Date: Jul. 22, 2010

(65) Prior Publication Data
US 2011/0267817 A1    Nov. 3, 2011

Related U.S. Application Data

(60) Provisional application No. 61/144,978, filed on Jan. 15, 2009.

(51) Int. Cl.
*F21V 7/00* (2006.01)
(52) U.S. Cl.
USPC ..................................... 362/296.01; 362/235
(58) Field of Classification Search
USPC ......... 362/290, 293, 296.01, 296.1, 627, 609, 362/612, 217.02, 311.01, 311.02, 311.12, 362/235, 97.1–97.3; 40/546, 564
See application file for complete search history.

(56) References Cited

U.S. PATENT DOCUMENTS

| | | | |
|---|---|---|---|
| 4,906,070 | A | 3/1990 | Cobb, Jr. |
| 4,984,144 | A | 1/1991 | Cobb, Jr. et al. |
| 5,056,892 | A | 10/1991 | Cobb, Jr. |
| 6,079,844 | A | 6/2000 | Whitehead et al. |
| 6,164,782 | A | 12/2000 | Pojar |
| 6,185,357 | B1 | 2/2001 | Zou et al. |
| 6,457,823 | B1 | 10/2002 | Cleary et al. |
| 6,481,882 | B1 | 11/2002 | Pojar |
| 6,809,892 | B2 | 10/2004 | Toyooka |
| 6,845,212 | B2 | 1/2005 | Gardiner et al. |
| 7,164,836 | B2 | 1/2007 | Wright et al. |
| 7,223,005 | B2 | 5/2007 | Lamb et al. |

(Continued)

FOREIGN PATENT DOCUMENTS

| | | |
|---|---|---|
| EP | 1 657 694 | 5/2006 |
| WO | WO 2006/125174 | 11/2006 |
| WO | WO 2008144656 A2 * | 11/2008 |

*Primary Examiner* — Mariceli Santiago
*Assistant Examiner* — Glenn Zimmerman

(57) ABSTRACT

A lighting element that includes a hollow enclosure, an optical lighting film, reflective interior surfaces, and a partially collimating light source is described. The lighting element can be used as a light block for illuminating light boxes, sign boxes, or luminaries. The lighting element can be rectangular in shape, thin, bright, uniform, energy efficient and lightweight, and can be configured to emit light from one or opposing surfaces. Additional light management elements, such as diffusing films, graphic films and information displays, can be positioned adjacent to the output surface(s) of the lighting element for a variety of applications. Several lighting elements can be tiled together to light larger areas and larger signs.

20 Claims, 2 Drawing Sheets

(56) References Cited

U.S. PATENT DOCUMENTS

| | | |
|---|---|---|
| 2004/0164325 A1 | 8/2004 | Siegel |
| 2006/0248761 A1* | 11/2006 | Cheung et al. ............. 40/564 |
| 2007/0223245 A1 | 9/2007 | Lee |
| 2008/0064115 A1 | 3/2008 | Hiramatsu et al. |
| 2008/0064125 A1 | 3/2008 | Peumans et al. |
| 2008/0064133 A1 | 3/2008 | Lee et al. |
| 2008/0068739 A1 | 3/2008 | Oyamada et al. |
| 2008/0158856 A1* | 7/2008 | Shen ......................... 362/84 |
| 2010/0046219 A1* | 2/2010 | Pijlman et al. ............. 362/235 |
| 2010/0214805 A1* | 8/2010 | Cheng et al. .............. 362/627 |

* cited by examiner

LIGHT BLOCK

CROSS REFERENCE TO RELATED APPLICATIONS

This application is a national stage filing under 35 U.S.C. 371 of PCT/US2010/020178, filed Jan. 6, 2010, which claims priority to U.S. Application No. 61/144,978, filed Jan. 15, 2009, the disclosure of which is incorporated by reference in their entirety herein.

BACKGROUND

Light boxes and sign boxes used to display graphics or other information bearing devices typically consist of a hollow box having reflective interior surfaces and a transparent or translucent top. The lighting method used in these boxes has traditionally been to use one or more fluorescent tubes, in order to provide for uniform lighting of the display graphic. Since fluorescent tubes are essentially bright lines of light, steps must be taken when using them in sign boxes to reduce hot spots. These steps include one or several of the following: heavy diffusers, greater offset distance of diffuser, tighter spacing between bulbs, and thicker boxes. All this translates into energy and material cost premiums. What is needed is a lighting device having superior brightness, uniformity, energy efficiency, form factor and weight than traditional fluorescent light boxes.

SUMMARY

In one aspect, the present disclosure provides a lighting element, a luminaire, a graphic display, and a light box that includes a hollow enclosure, a partially collimated light source, an optical lighting film (OLF), and a plurality of light extraction elements disposed proximate the OLF. The hollow enclosure includes a base, an output region, and sides connecting the base to the output region, wherein the base and the sides each have a reflective surface interior to the hollow enclosure. The partially collimated light source is disposed adjacent to an edge of the base, and is capable of injecting light into the hollow enclosure within a 40 degree angle of a transverse plane parallel to the base. The OLF is adjacent to the output region and includes a plurality of parallel vee-shaped grooves facing the base and extending in direction perpendicular to the edge.

In another aspect, the present disclosure provides a lighting element a luminaire, a graphic display, and a light box that includes a hollow enclosure, a partially collimated light source, a first optical lighting film (OLF), a second OLF, and a plurality of light extraction elements disposed proximate the first OLF. The hollow enclosure includes a first output region, a second output region, and sides connecting the first output region and the second output region, wherein the sides have a reflective surface interior to the hollow enclosure. The partially collimated light source is disposed adjacent to an edge of the second output region, and is capable of injecting light into the hollow enclosure within a 40 degree angle of a transverse plane parallel to the second output region. The first optical lighting film (OLF) is adjacent to the first output region, and the first OLF includes a plurality of parallel vee-shaped grooves facing the second output region and extending in direction perpendicular to the edge. The second OLF is adjacent to the second output region, and the second OLF includes a plurality of parallel vee-shaped grooves facing the first OLF and extending in direction perpendicular to the edge.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
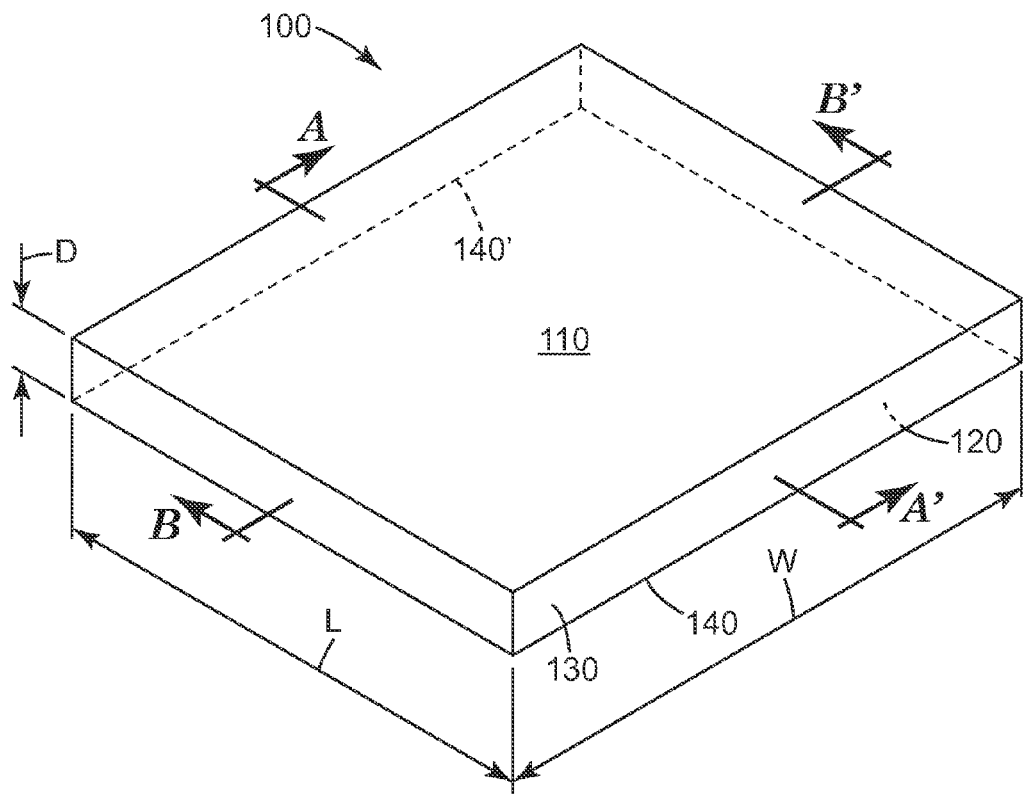
FIG. 1 is a perspective view of a lighting element.

A lighting element useable as a light block is described. The lighting element comprises a lightweight rigid structure, light-management films and a light source. The lighting element, or light block, can be configured to be placed into existing light boxes, sign boxes, and luminaries to replace conventional fluorescent tubes. The light block can be rectangular, thin, bright, uniform, energy efficient and lightweight, and can be configured to emit light from one or opposing surfaces. Additional light management elements, such as diffusing films, graphic films and information displays, can be positioned adjacent to the output surface(s) of the light block for a variety of application. A plurality of lighting elements can be tiled together to light larger areas and larger signs.

Generally, the structure of the lighting element is provided by an aluminum frame that defines the sides of the lighting element. The aluminum frame can have a "C-shaped" cross-section and can be affixed to an aluminum bottom and a transparent output surface, thereby forming a hollow enclosure between them. In an alternative embodiment, an aluminum sheet can be bent to form the sides and bottom of an open-top box and a transparent outer surface can be affixed, enclosing the top to create a hollow enclosure. In yet another embodiment, a first transparent output surface can be affixed to an aluminum frame, defining an open-top box, and a second transparent output surface can be affixed enclosing the top, thereby forming a hollow enclosure. In yet another embodiment, the aluminum frame, the aluminum bottom, or both, can be instead formed from any lightweight rigid material such as other metals, thermoplastics, or plastic composites.

OLF (Optical Lighting Film), such as Vikuiti™ OLF available from 3M Company, can be used as the transparent output surface of the lighting element. A lighting element having a construction where the OLF prisms face inward protects the fragile grooved surface, and improves the brightness-to-uniformity balance especially in enclosures with a large aspect ratio; in other words, very thin cavities. The aspect ratio is the length of the enclosure divided by its thickness (or height). Aspect ratio can affect the number of light-ray bounces which in turn can affect efficiency of light propagation. For example, light injected at a 20 degree half angle into a hollow light guide with a thickness of 1 inch and a length of 48 inches, bounces about 19 times. A ⅜ inch solid light guide of the same length causes about 50 bounces. Generally, more bounces reduce the efficiency. In some embodiments, a graphic sheet can be affixed directly to the lighting element to allow it to function as a stand-alone sign. The graphic can be adhered directly to the OLF or to a plate positioned over the OLF, and can help to seal and protect the dots as well as provide UV protection for the OLF.

All other interior surfaces of the hollow enclosure are highly reflective surfaces, such as a polished metal surface, a surface deposited metal mirror, a metalized polymeric film, or a multilayer dielectric reflector such as a polymeric multi-layer optical film. A preferred highly reflective surface can be a Vikuiti™ Enhanced Specular Reflector (ESR) film available from 3M Company.

The bottom, sides, and top of the lighting element can be attached using any known technique, including those described in PCT Application No. US2008/068739 entitled OPTICALLY TRANSMISSIVE COMPOSITE FILM FRAME. Adhesive attachment using Very High Bond (VHB) tape available from 3M Company is a preferred technique of attachment.

A light source placed adjacent one edge of the hollow enclosure injects light into the hollow enclosure. The injected light can reflect several times from the interior surfaces of the enclosure before leaking out of the transparent outer surface. The uniformity of the light exiting the transparent outer surface is improved by mixing of the light due to the multiple reflections. Light can be injected along one edge, or light can be injected along two opposing edges. The ESR disposed on the sides and bottom of the enclosure, can transport the light further down the length of the enclosure through reflections, whereas the OLF generally reflects only the shallow angles below the critical angles, and transmits light at all other angles.

The light source is a partially collimated light source that is capable of injecting light into the hollow enclosure within a narrow range of angles from a transverse plane within the hollow enclosure. The transverse plane is essentially parallel to the bottom, or base, of the hollow enclosure, and the narrow range of angles is within 40, 30, 20, or even 10 degrees of the transverse plane. The partially collimated light source can include a wedge-shaped reflector, including those described for example in PCT Patent Application No. US2008/064115 entitled RECYCLING BACKLIGHTS WITH SEMISPECU-LAR COMPONENTS, and PCT Patent Application No. US2008/064125 entitled COLLIMATING LIGHT INJEC-TORS FOR EDGE-LIT BACKLIGHTS. The wedge-shaped reflector collimates light from the source, such as a Light Emitting Diode (LED), sending it forward into the hollow enclosure at shallow angles. The partially collimated light source can also include other optics, such as lenses, to provide the desired collimation.

The partially collimated light source can include any suitable light source including, e.g., a surface emitting LED, such as a blue- or UV emitting-LED with a down-converting phosphor to emit white light hemispherically from the surface; individual colored LEDs, such as arrangements of red/green/blue (RGB) LEDs; and others such as described in PCT Patent Application No. US2008/064133 entitled BACK-LIGHT AND DISPLAY SYSTEM USING SAME. A plurality of LEDs and the associated collimating devices can be distributed along the edge of the hollow enclosure to provide the desired light intensity and uniformity.

Injected light can exit the enclosure by being redirected to angles outside of the critical angle so it can pass through the OLF. This can be accomplished by the use of light extraction elements, such as diffuse reflective white extraction dots printed onto the smooth side of the OLF. The light extraction element can include light extraction patterns that are positioned precisely to extract light by refraction, reflection, diffusion or similar processes. In one embodiment, the light extraction elements can include particulates such as refractive or diffusive beads, diffusing particles, down-converting materials such as phosphors, microstructures, textures and the like. Examples of light extraction elements can be found, for example, in U.S. Pat. Nos. 6,845,212 (Gardiner et al.) and 7,223,005 (Lamb et al.); and also in U.S. patent application Ser. Nos. 11/421,241 and 61/108,606.

The light extraction elements can be disposed inside of the hollow enclosure, on the surface of the ESR, on either surface of the OLF, or a combination thereof. The extraction elements can be dots patterned across the surface of the OLF in a gradient fashion where the coverage increases the greater the distance from the partially collimated light source. Dots located on the ESR may behave slightly different from dots on the OLF, because light transmitted through the dots is redirected into the hollow enclosure instead of exiting. Generally, it does not matter where the dots are located provided they are arranged in a suitable pattern to disrupt the specular flow of light through the hollow enclosure.

The dots can be located anywhere in the path of the light, for example even on a suspended light extraction film disposed within the hollow enclosure. In one embodiment, the light extraction film can include an ESR film with dots, tilted in the hollow enclosure and non-planer to the OLF. In this embodiment, a constant dot pattern (non gradient) can be used, since the proximity of the dots to the OLF provides a very similar affect as graduated dots. Alternatively the constant dot-pattern can be located on the OLF when using an ESR film non-planar to the OLF. In some embodiments, and for some aspect ratios, no extraction element is required.

FIG. 1 shows a perspective view of a lighting element 100 according to one aspect of the disclosure. Lighting element 100 includes an output region 110, a base 120 opposite the output region 110, and sides 130 connecting the base 120 to the output region 110. Lighting element 100 can have an output region that is rectangular in shape as shown in FIG. 1, having a length "L", a width "W" and a depth "D". As will be disclosed elsewhere, a first edge 140 of lighting element 100 along width "W" determines the orientation and placement of other components, such as a light source (not shown) included within lighting element 100, as described elsewhere. A second edge 140' is located along width "W" and generally parallel to first edge 140, but displaced by length "L". Lighting element 100 can be a self-contained light block having exterior electrical connections so that when electrical power is applied, light is emitted from the output region 110 in a substantially uniform manner.

Figure 2:
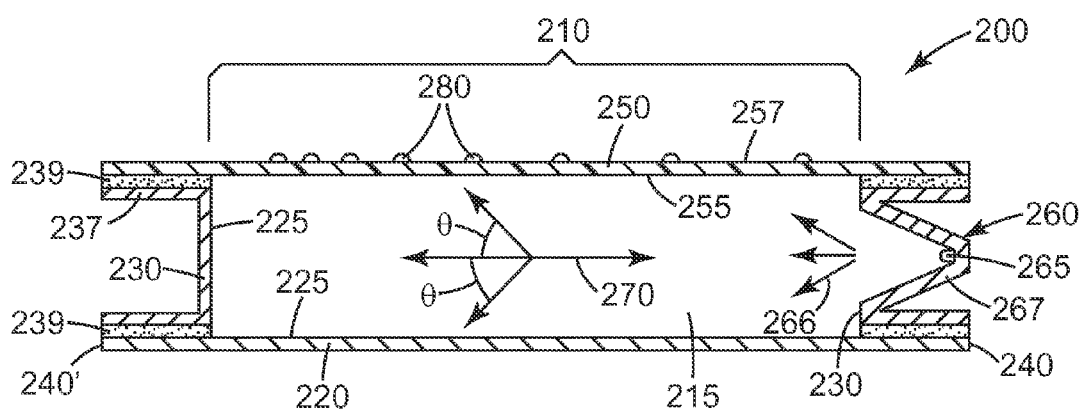
FIG. 2 is a cross-sectional view of a lighting element.

FIG. 2 shows a cross-sectional view of a lighting element 200 which is one embodiment of lighting element 100 through section A-A' shown in FIG. 1. Lighting element 200 includes an output region 210, a base 220, and sides 230 connecting the base 220 to the output region 210, forming a hollow cavity 215 between them. Lighting element 200 further includes a partially collimated light source 260 disposed adjacent a first edge 240 of base 220.

Partially collimated light source 260 includes at least one light element 265 and collimating optics 267. The at least one light element 265 preferably includes a plurality of light sources, such as Light Emitting Diode (LED) sources, although any light source can be used. The LEDs can be disposed along the entire width "W" of the lighting element 200, with any desired spacing between adjacent LEDs. The number and relative placement of the LEDs can be varied according to the desired brightness and uniformity of the light exiting the lighting element through the output surface 210. As shown in FIG. 2, collimating optics 267 can be a wedge-shaped reflector, or it can include a lens (not shown), as known to those skilled in the art. The partially collimating light source 260 is capable of injecting a plurality of light rays 266 into the hollow cavity 215 within a narrow range of angles, such as within a range of angles θ from a transverse plane 270 parallel to the base 220. The plurality of light rays 266 can be injected into the hollow cavity 215 within the range of angles θ from 40, 30, 20, or even 10 degrees of the transverse plane, again depending on the desired brightness and uniformity of the light exiting the lighting element through output surface 210. In another embodiment, a second partially collimated light source (not shown) can be disposed adjacent a second edge 240' opposite the first edge 240 of adjacent base 220.

Each of the sides 230 and base 220 have a reflective surface 225 interior to the hollow cavity 215. The reflective surface 225 can include any known reflector, such as a polished metal surface, a surface deposited metal mirror, a metalized polymeric film, or a multilayer dielectric reflector such as a polymeric multilayer optical film. A preferred reflector can be an Vikuiti™ Enhanced Specular Reflector (ESR) film available from 3M Company. ESR has a particularly high specular reflectance, and enhances the brightness and uniformity of the lighting element 200.

An optical lighting film (OLF) 250 is disposed adjacent to output surface 210. OLF 250, such as Vikuiti™ OLF available from 3M Company, has an exterior surface 257 that is generally planar, and an interior surface 255 comprised of a plurality of parallel vee-grooves, as described elsewhere. In one embodiment, OLF 250 can also include a plurality of extraction elements 280 disposed on the exterior surface 257 as shown in FIG. 2. In other embodiments (not shown), the plurality of extraction elements 280 can be disposed in several locations within lighting element 200, such as on the interior surface 255 of OLF 250, the interior surface 225 of base 220, or interior to the hollow cavity 215 as described elsewhere. Extraction elements 280 can be printed, textured, or microstructured, as known to those skilled in the art. Extraction elements 280 are preferably printed extraction elements disposed in a gradient array, so the areal density of the extraction elements 280 increases as the distance from partially collimated light source 260 increases, As shown in FIG. 2, OLF 250 can be adhered to a flange 237 extending from side 230, using an adhesive layer 239. Adhesive layer 239 can be any adhesive, including Very High Bond (VHB) adhesive tape available from 3M Company. In some embodiments, adhesive layer 239 can also be a transparent adhesive such that light rays 266 can propagate between flange 237 and OLF 250, lighting the region outside of output surface 210. Base 220 can be formed from a rigid material, such as a sheet of aluminum, and base 220 can be adhered to side 230 using adhesive layer 239 as shown in FIG. 1. In another embodiment (not shown), side 230 can be integral to the base 220 and formed by bending the aluminum sheet base.

Operation of lighting element 200 according to one aspect of the disclosure will now be described with reference to FIG. 2. Light rays 266 from partially collimating light source 260 are injected into hollow cavity 215 within a range of angles θ of the transverse plane 270. Light rays 266 can undergo multiple specular reflections from reflective surfaces 225 and also from interior surface 255 of OLF 250. A portion of the light intercepting interior surface 255 of OLF 250 is redirected from the hollow cavity 215 and exits output surface 210.

In some embodiments (not shown), base 220 can instead be a second OLF disposed with the vee-grooved surface facing interior to cavity 215 in the same manner as OLF 250. Extraction elements can be disposed proximate the second OLF in the same manner as described above for OLF 250. In this embodiment, light can exit from both output surface 210 and base 220, resulting in a two-sided lighting element.

Figure 3:
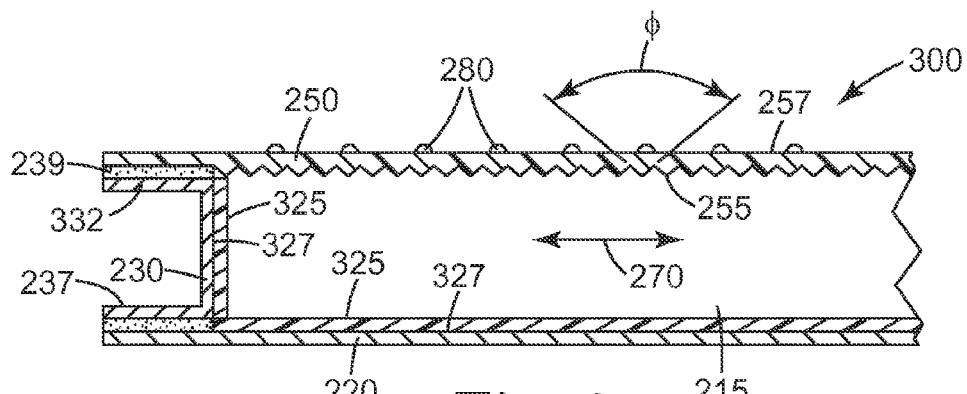
FIG. 3 is a cross-sectional view of a lighting element.

FIG. 3 shows a cross-sectional view of a lighting element 300 which is one embodiment of lighting element 100 through section B-B' of FIG. 1. Section B-B' is perpendicular to section A-A' and shows the vee-shaped grooved surface 255 of OLF 250. Section B-B' is also shown as one embodiment of the lighting element 200 shown in FIG. 2. Elements having like numbers in FIG. 3 correspond to elements having like numbers in FIG. 2. Lighting element 300 includes the output region 210, the base 220, and the sides 230 connecting the base 220 to the output region 210, forming the hollow cavity 215 between them.

Each of the sides 230 and base 220 have an interior surface 327 and a reflective surface 325 interior to the hollow cavity 215. The reflective surface 325 shown in FIG. 3 can be Vicuiti Enhanced Specular Reflector (ESR) film available from 3M Company. The optical lighting film (OLF) 250 has an exterior surface 257 that is generally planar, and an interior surface 255 comprised of a plurality of parallel vee-grooves. Each of the parallel vee-shaped grooves has an included angle φ as shown in FIG. 3. The included angle φ can be about 90 degrees, or it can range from about 70 degrees to about 110 degrees, or from about 85 degrees to about 95 degrees. In one embodiment, OLF 250 can also include a plurality of extraction elements 280 disposed on the exterior surface 257 as shown in FIG. 3. Light extraction elements 280 can be disposed in a gradient array as described elsewhere. In other embodiments, the plurality of extraction elements 280 can be disposed in several locations within lighting element 300, such as on the interior surface 255 of OLF 250, the interior surface of reflector 225 adjacent base 220, or interior to the hollow cavity 215 as shown in FIG. 4.

Figure 4:
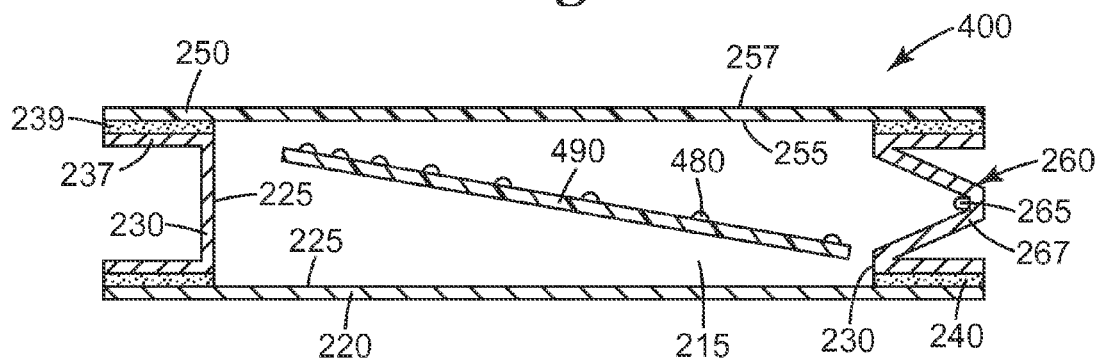
FIG. 4 is a cross-sectional view of a lighting element.

FIG. 4 shows a cross-sectional view of a lighting element 400 which is one embodiment of lighting element 100. Like numbered elements in FIG. 4 correspond to like numbered elements of FIG. 2. In FIG. 4, light extraction elements 480 are disposed on a light extraction film 490 which can be positioned anywhere within cavity 215. In one embodiment shown in FIG. 4, light extraction film 490 can be positioned within cavity 215 at an angle relative to transverse plane 270. In one embodiment, light extraction film 490 can be a transparent film that serves to support the extraction elements 480. In another embodiment, light extraction film 490 can be an ESR film, thereby forming a wedge-shaped reflective cavity between OLF 250 and partially collimating light source 260.

Figure 5:
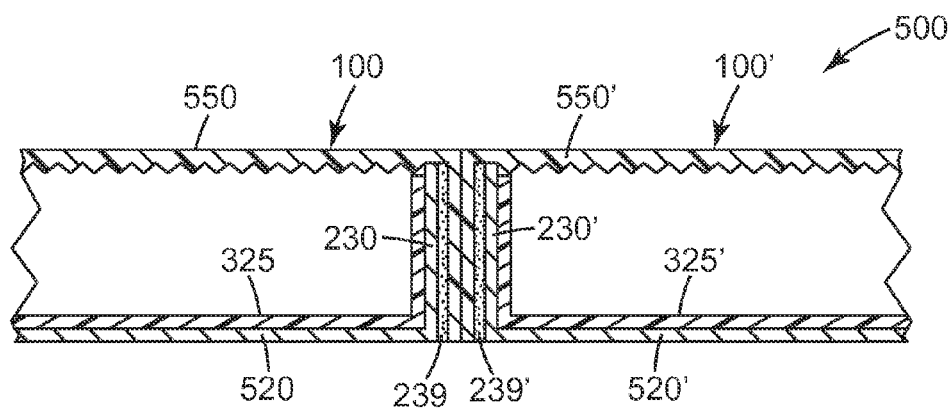
FIG. 5 is a cross-sectional view of a pair of lighting elements.

FIG. 5 shows a cross-sectional view of a pair of lighting elements 500 abutted together, according to one aspect of the disclosure. The pair of lighting elements 500 includes a first lighting element 100 and a second lighting element 100', each having a base 520, 520', sides 230, 230', and OLF 550, 550', respectively. Sides 230, 230' can be formed integral to base 520, 520', respectively, as shown. A reflective film 325, 325' such as ESR film can be disposed on interior surfaces of base 520, 520' and side 230, 230', as described elsewhere. OLF 550, 550' can be attached to side 230, 230' using adhesive 239, 239', respectively, as described elsewhere.

Figure 6:
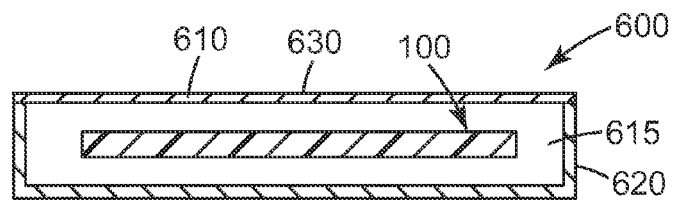
FIG. 6 is a cross-sectional view of a lightbox.

FIG. 6 shows a cross sectional view of a lightbox 600 according to one aspect of the disclosure. In FIG. 6, a lighting element 100 is placed within hollow cavity 615 formed by enclosure 620 and transparent plate 610. Transparent plate 610 includes output surface 630, where information bearing graphics such as advertising signs can be disposed. Enclosure 620 and transparent plate 610 can be components of commercially available lightboxes, which have the conventional lighting sources, such as fluorescent tubes and the like, removed.

EXAMPLES

Several test lighting elements similar to the design shown in FIGS. 1-3 were fabricated from aluminum sheeting, affixed together using VHB tape. All interior surfaces (with the exception of the output region) of the lighting element were covered with ESR film. The test lighting elements had an output region width "W" of 12 inches (30.48 cm) and a length "L" of 22 inches (55.9 cm). The depth "D" was varied as shown in Table 1, to evaluate different aspect ratios (L/D).

The light source was a Citizen CL-L102-C7N LED array having a footprint measuring 7 mm by 50 mm, driven at a current of 350 mA. The light source was placed at the base of a collimating optic. The collimating optic was a wedge having a depth (i.e. parallel to the transverse plane) of approximately 1.08 inches (2.74 cm), and an opening (i.e. perpendicular to the transverse plane) of approximately 0.88 inches (2.23 cm), as shown in FIG. 2. This partially collimated light source provided a collimation range of angles within θ=20 degrees of the transverse plane. Four partially collimated light sources were placed across the width "W" of the test lighting element.

A printed OLF (POLF) was prepared by printing a gradient array of white light extraction dots on the smooth exterior surface of Vikuiti™ OLF, available from 3M Company. The areal density of the dots varied along the distance measured from the light source (Position=0), as shown in Table 2. The POLF was affixed on the output region using VHB tape as shown in FIGS. 2 and 3. The POLF was oriented with the vee-shaped grooves interior to the hollow cavity as shown in FIG. 3 (identified as "prisms down"). For comparison, results were also measured for a conventional lighting element having a diffuser only, and also for a lighting element oriented with the POLF vee-shaped grooves exterior to the hollow cavity (identified as "prisms up").

The brightness and uniformity of the light exiting the output region was measured using a Prometric Camera (Radiant Imaging PM Series Imaging Colorimeter PM-9913E-1), placed about 1.5 m away from the output region of the prototype. The brightness (candelas/m²) and uniformity (minimum brightness/maximum brightness) measurements are listed in Table 1 below for several lighting element depths (D), and output region films. The data excluded edge effects by eliminating approximately 10% of the data on the light injection edge and the opposing edge.

TABLE 1

| No. | Output Film | D, cm | L/D | Uniformity (Min/Max) | Brightness, (cd/m²) |
|---|---|---|---|---|---|
| 1 | Diffuser Only | 5.74 | 10 | 0.46 | 1922 |
| 2 | POLF (prisms up) | 5.74 | 10 | 0.85 | 1844 |
| 3 | POLF (prisms up) | 4.09 | 14 | 0.64 | 1906 |
| 4 | POLF (prisms down) | 5.18 | 11 | 0.82 | 1873 |
| 5 | POLF (prisms down) | 4.65 | 12 | 0.87 | 1880 |
| 6 | POLF (prisms down) | 4.09 | 14 | 0.91 | 1910 |
| 7 | POLF (prisms down) | 3.00 | 19 | 0.80 | 1940 |

TABLE 2

| | Position, inches | | | | | | | | | | | |
|---|---|---|---|---|---|---|---|---|---|---|---|---|
| | 0 | 2 | 4 | 6 | 8 | 10 | 12 | 14 | 16 | 18 | 20 | 22 |
| Areal Density, % | 8 | 11.5 | 15 | 19 | 23 | 27 | 31.5 | 37 | 43 | 50 | 56 | 60 |

The lighting element can be used to satisfy needs in signage market for thin, light-weight uniform, bright, energy efficient and environmentally friendly lighting systems to replace fluorescent tubes. It also allows sign manufacturers to use light management films, such as 3M light management films, in a plug-and-play mode instead of struggling to understand how to position and support the films. Considering its brightness, uniformity, energy efficiency, form factor and weight, it can be an excellent lighting solution for the sign box industry.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:
1. A lighting element, comprising:
 a hollow enclosure comprising a base, an output region, and sides connecting the base to the output region, wherein the base and the sides each have a reflective surface interior to the hollow enclosure;
 a partially collimated light source disposed adjacent to an edge of the base, capable of injecting light into the hollow enclosure within a 40 degree angle of a transverse plane parallel to the base;
 an optical lighting film (OLF) adjacent to the output region, the OLF comprising a plurality of parallel vee-shaped grooves facing the base and extending in a direction perpendicular to the edge; and
 a plurality of light extraction elements disposed proximate the OLF.

2. The lighting element of claim 1, wherein the reflective surface comprises a polymeric multilayer interference reflector.

3. The lighting element of claim 1, wherein the partially collimated light source comprises at least one light emitting diode (LED).

4. The lighting element of claim 1, wherein the OLF comprises vee-shaped grooves having an included angle between 85 degrees and 95 degrees.

5. The lighting element of claim 1, wherein the plurality of light extraction elements are disposed within the hollow enclosure.

6. The lighting element of claim 1, wherein the plurality of light extraction elements are disposed adjacent the OLF and opposite the vee-shaped grooves.

7. The lighting element of claim 1, wherein the plurality of light extraction elements comprise a gradient light extraction film.

8. The lighting element of claim 1, wherein light injected into the hollow enclosure from the partially collimated light source exits the hollow enclosure through the output region with a brightness that varies less than 20% over the output region.

9. A lighting element, comprising:
  a hollow enclosure comprising a first output region, a second output region, and sides connecting the first output region and the second output region, wherein the sides have a reflective surface interior to the hollow enclosure;
  a partially collimated light source disposed adjacent to an edge of the second output region, capable of injecting light into the hollow enclosure within a 40 degree angle of a transverse plane parallel to the second output region;
  a first optical lighting film (OLF) adjacent to the first output region, the first OLF comprising a plurality of parallel vee-shaped grooves facing the second output region and extending in direction perpendicular to the edge;
  a second OLF adjacent to the second output region, the second OLF comprising a plurality of parallel vee-shaped grooves facing the first OLF and extending in the direction perpendicular to the edge; and
  a plurality of light extraction elements disposed proximate the first OLF.

10. The lighting element of claim 9, wherein the reflective surface comprises a polymeric multilayer interference reflector.

11. The lighting element of claim 9, wherein the partially collimated light source comprises at least one light emitting diode (LED).

12. The lighting element of claim 9, wherein the OLF comprises vee-shaped grooves having an included angle between 85 degrees and 95 degrees.

13. The lighting element of claim 9, wherein the plurality of light extraction elements are disposed within the hollow enclosure.

14. The lighting element of claim 9, wherein the plurality of light extraction elements are disposed adjacent the first OLF and opposite the vee-shaped grooves.

15. The lighting element of claim 14, further comprising a second plurality of light extraction elements disposed adjacent the second OLF and opposite the vee-shaped grooves.

16. The lighting element of claim 9, wherein the plurality of light extraction elements comprise a first gradient light extraction film.

17. The lighting element of claim 15, wherein the second plurality of light extraction elements comprise a second gradient light extraction film.

18. The lighting element of claim 9, wherein light injected into the hollow enclosure from the partially collimated light source exits the hollow enclosure through the first output region with a brightness that varies less than 20% over a surface of the first output region, and also exits through the second output region with a brightness that varies less than 20% over a surface of the second output region.

19. A luminaire comprising the lighting element of claim 1 or claim 9.

20. A graphic display comprising the lighting element of claim 1 or claim 9.

* * * * *